United States Patent
Wu et al.

(10) Patent No.: US 9,577,555 B2
(45) Date of Patent: Feb. 21, 2017

(54) METHODS OF ESTIMATING A POSITION OF A ROTOR IN A MOTOR UNDER TRANSIENT AND SYSTEMS THEREOF

(71) Applicants: DEERE & COMPANY, Moline, IL (US); The Board of Regents of the University of Nebraska, Lincoln, NE (US)

(72) Inventors: Long Wu, Fargo, ND (US); Yue Zhao, Lincoln, NE (US); Wei Qiao, Lincoln, NE (US)

(73) Assignees: DEERE & COMPANY, Moline, IL (US); THE BOARD OF REGENTS OF THE UNIVERSITY OF NEBRASKA, Lincoln, NE (US)

( * ) Notice: Subject to any disclaimer, the term of this patent is extended or adjusted under 35 U.S.C. 154(b) by 232 days.

(21) Appl. No.: 14/243,252

(22) Filed: Apr. 2, 2014

(65) Prior Publication Data
US 2015/0288306 A1 Oct. 8, 2015

(51) Int. Cl.
*H02P 6/00* (2016.01)
*H02P 6/18* (2016.01)
*H02P 21/00* (2016.01)
*H02P 23/12* (2006.01)

(52) U.S. Cl.
CPC ............ *H02P 6/18* (2013.01); *H02P 21/0007* (2013.01); *H02P 21/18* (2016.02); *H02P 23/12* (2013.01)

(58) Field of Classification Search
USPC ................................ 318/400.32, 400.16, 721
See application file for complete search history.

(56) References Cited

U.S. PATENT DOCUMENTS

| 2003/0011340 | A1 | 1/2003 | Odachi et al. |
| 2004/0201358 | A1* | 10/2004 | Kawaji ............... H02P 25/092 318/701 |
| 2008/0069547 | A1* | 3/2008 | Jiang ................. H02P 21/13 388/811 |
| 2013/0162191 | A1* | 6/2013 | Kashiwa ............. H02P 8/38 318/696 |
| 2013/0229135 | A1 | 9/2013 | Long et al. |
| 2013/0231891 | A1 | 9/2013 | Long et al. |

FOREIGN PATENT DOCUMENTS

| JP | 2006174641 A | 6/2006 |
| JP | 2007236015 A | 9/2007 |
| JP | 2010051151 A | * 3/2010 |
| JP | 2010259131 A | 11/2010 |

OTHER PUBLICATIONS

GB Search Report dated Oct. 8, 2015.

* cited by examiner

*Primary Examiner* — Jorge L Carrasquillo
(74) *Attorney, Agent, or Firm* — Harness, Dickey & Pierce, P.L.C.

(57) ABSTRACT

At least one example embodiment discloses a method of estimating a position of a rotor in a motor. The method includes obtaining a current regulation quality index based on a current command and a measured current, determining an estimated position of the rotor based on the current regulation quality index and position estimation data and controlling the motor based on the estimated position of the rotor.

30 Claims, 6 Drawing Sheets

METHODS OF ESTIMATING A POSITION OF A ROTOR IN A MOTOR UNDER TRANSIENT AND SYSTEMS THEREOF

FIELD

Example embodiments are related to electric drive device systems and/or methods for controlling electric drive devices such as Interior Permanent Magnet (IPM) motors or machines.

BACKGROUND

IPM synchronous motors (IPMSMs) are used in hybrid and electric vehicle systems. Rotor position of the IPMSM is used for high-performance traction or voltage control of the IPMSM.

Electromechanical type of position sensors, e.g., resolvers, optical encoders, and hall-effect sensors, are used to obtain the rotor position and/or speed in IPMSM drive systems. The use of these electromechanical sensors increases cost, size, weight, and hardware wiring complexity of the IPMSM drive systems. Moreover, mounting electromechanical sensors on a rotor of the motor affects the robustness of the IPMSM. Sensors are often subject to failures in harsh environments, such as excessive ambient temperature, super high-speed operation, and other adverse or heavy load conditions.

As an alternative to sensors, sensorless drives including observers are used. One type of an art recognized observer is a sliding mode observer (SMO). A SMO is embodied in a specific purpose computer, mainly a microcontroller or digital signal processor specifically programmed to execute the SMO. In general, a SMO is an observer having inputs that are discontinuous functions of an error between estimated and measured outputs. In a SMO, a manifold is designed such that a system state trajectory exhibits a certain behavior when confined to the manifold. The manifold may also be referred to as a sliding surface.

SUMMARY

Example embodiments disclose methods of estimating a position of a rotor in a motor and systems thereof.

Example embodiments improve the stability of a sensorless drive system by implementing an adaptive speed assisted position prediction scheme.

At least one example embodiment discloses a method of estimating a position of a rotor in a motor. The method includes obtaining a current regulation quality index based on a current command and a measured current, determining an estimated position of the rotor based on the current regulation quality index and position estimation data and controlling the motor based on the estimated position of the rotor.

At least another example embodiment discloses a system including a processor configured to estimate a position of a rotor in a motor. The processor is configured to obtain a current regulation quality index based on a current command and a measured current and determine an estimated position of the rotor based on the current regulation quality index and position estimation data.

BRIEF DESCRIPTION OF THE DRAWINGS

Example embodiments will be more clearly understood from the following detailed description taken in conjunction with the accompanying drawings. FIGS. 1A-5 represent non-limiting, example embodiments as described herein.

FIG. 1A illustrates a drive system for controlling an IPM machine according to an example embodiment;

FIG. 2 illustrates an example embodiment of a position and speed estimator shown in FIG. 1A;

FIG. 3 illustrates an example embodiment of how an adjuster selects at least one of an output from an observer and a position based on speed estimator to generate an estimated position of a rotor;

FIG. 4 illustrates an example embodiment of the position based on speed estimator; and FIG. 5 illustrates a method of estimating a position of a rotor in a motor according to an example embodiment.

DETAILED DESCRIPTION

Figure 1A:
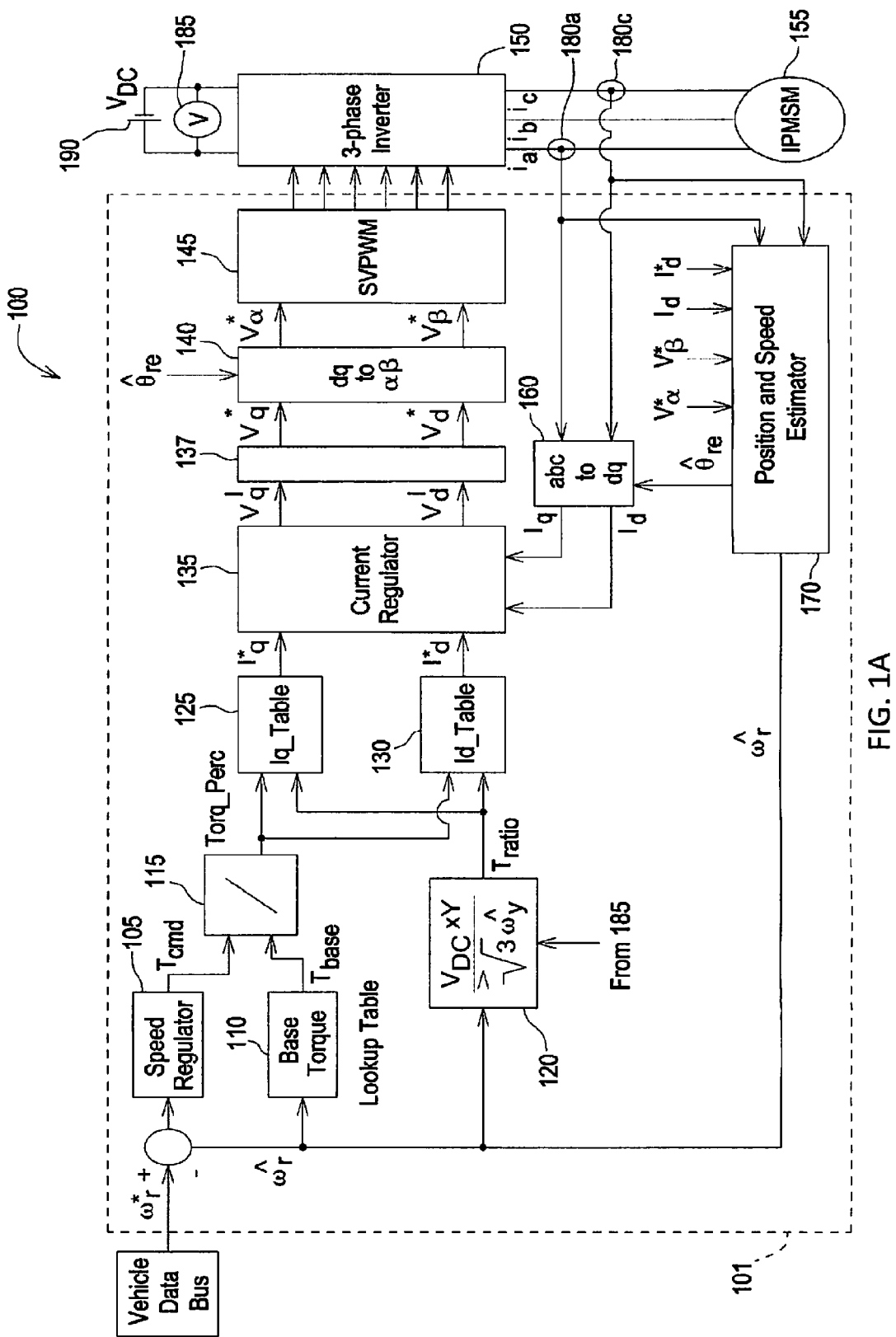

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

In controlling a motor, a pulse width modulation generator (e.g., space vector pulse width modulation) may generate gate signals for switching components in an inverter, which subsequently supplies current to the motor.

In a motor drive system, there are instances where the system uses rotor position information. In coordinate transformation, current transducers (CTs), mounted on the wires between the inverter and motor, can measure the value of phase currents, e.g., $I_{abc}$. However, $I_{dq}$ is used by the drive system, such that an abc to dq coordinate transformation is adopted and rotor position is used to perform the transformation. Secondly, according to the SVPWM, a sector number is based on information of the voltage commands $v^*_d$ and $v^*_q$. Because of this, rotor position is used to perform dq to αβ transformation. Thirdly, a rotor position sensor only gives out the rotor position information and if speed information is needed, the derivative of rotor position or moving average of rotor position will be used to calculate speed information. Consequently, inaccurate rotor position information degrades the performance of the motor, but also introduce instabilities to the drive system.

FIGS. 1A-4 illustrate a system including a processor configured to estimate a position of a rotor in a motor. The processor is configured to obtain a current regulation quality index based on a current command and a measured current and determine an estimated position of the rotor based on the current regulation quality index and position estimation data.

In an example embodiment, the processor is configured to obtain a current margin based on the current command, determine a first difference between the current command and the measured current, and obtain the current regulation quality index based on the current margin and the first difference.

In an example embodiment, the processor is configured to determine if the current command exceeds a threshold value and obtain the current margin, the current margin having a numerical value if the current command is below the threshold value and the current margin being a percentage of the current command if the current command is greater than or equal to the threshold value.

In an example embodiment, the processor is configured to determine the first difference and additional differences between the current command and the measured current over an interval of time, the first difference and additional differences being a plurality of differences, determine, for each of the plurality of differences, if the difference is within the current margin, generate a cycle quality index value for each of the plurality of differences based on whether the difference is within the current margin, the cycle quality index value being one of a first value and a second value, and obtain the current regulation quality index based on whether a consecutive number of the cycle quality index values are the second value.

In an example embodiment, the processor is configured to determine a plurality of cycle quality index values for a plurality of cycles, respectively, each cycle quality index value representing a current regulation quality for the corresponding cycle and obtain the current regulation quality index based on the plurality of cycle quality index values, the current regulation quality index being one of a first value and a second value, the current regulation quality index having the second value when a consecutive number of the plurality of cycle quality index values are the second value for a first number of cycles.

In an example embodiment, the processor is configured to initially select a first algorithm when the current regulation quality index is the second value and determine a first estimated position of the rotor using the first algorithm, the first estimated position of the rotor associated with a first cycle.

In an example embodiment, the processor is configured to determine the first estimated position using a sliding mode observer.

In an example embodiment, the processor is configured to use the first algorithm for a single cycle.

In an example embodiment, the processor is configured to select a second algorithm after determining the first estimated position of the rotor and determine subsequent estimated positions of the rotor using the second algorithm, the subsequent estimated positions of the rotor being associated with a number of cycles subsequent to the first cycle.

In an example embodiment, for each subsequent estimated position of the rotor, the processor is configured to obtain a plurality of position changes of the rotor between consecutive cycles and a plurality of time durations between the consecutive cycles, obtain an estimated speed of the rotor based on the plurality of position changes and the plurality of time durations, and determine the subsequent estimated position of the rotor based on the estimated speed.

In an example embodiment, the processor is configured to use the second algorithm for at least a second number of cycles.

In an example embodiment, the processor is configured to use the second algorithm until the current regulation quality index channel is the second value after the second number of cycles.

In an example embodiment, the processor is configured to determine a difference between the first estimated position and a previous subsequent estimated position, weight the previous subsequent estimated position based on the difference between the first estimated position and the previous subsequent estimated position, and select the weighted previous subsequent estimated position to use in the second algorithm.

In an example embodiment, the processor is configured to determine a difference between the first estimated position and a previous subsequent estimated position, determine if the difference between the first estimated position and the previous subsequent estimated position exceeds an adjustment threshold, apply a slew rate to the first estimated position if the difference between the first estimated position and the previous subsequent estimated position exceeds the adjustment threshold, and select the slewed first estimated position to use in the second algorithm.

In an example embodiment, the cycles are pulse-width modulation (PWM) cycles. In an example embodiment, the cycles are halves of pulse-width modulation (PWM) cycles.

In accordance with an example embodiment, FIG. 1A illustrates a drive system 100 for controlling an IPM machine such as a motor 155 (e.g., an interior permanent magnet synchronous motor (IPMSM)) or another alternating current machine. The drive system 100 may also be referred to as an IPMSM drive system.

It should be understood that the drive system 100 may include additional features that are not illustrated in FIG. 1A. For example, the drive system 100 may include a rotor magnet temperature estimation module, a current shaping module, and a terminal voltage feedback module. The features shown in FIG. 1A are illustrated for the convenience of describing the drive system 100 and it should be understood that the drive system 100 should not be limited to the features shown in FIG. 1A.

The system 100 includes electronic modules, software modules, or both. In an example embodiment, the drive system 100 includes an electronic data processing system 101 to support storing, processing or execution of software instructions of one or more software modules. The electronic data processing system 101 is indicated by the dashed lines in FIG. 1A, is shown in greater detail in FIG. 1B and may also be referred to as a processor.

The data processing system 101 is coupled to an inverter circuit 150. The inverter circuit 150 may be a three-phase inverter. The inverter circuit 150 includes a semiconductor drive circuit that drives or controls switching semiconductors (e.g., insulated gate bipolar transistors (IGBT) or other power transistors) to output control signals for the motor 155. In turn, the inverter circuit 150 is coupled to the motor 155. The motor 155 is associated with sensors 180a and 180c.

Throughout the specification, the sensors 180a and 180c are referred to as current transducers. However, it should be understood that the sensors 180a and 180c may be another type of current sensor.

The current transducers 180a and 180c and the motor 155 are coupled to the data processing system 101 to provide feedback data (e.g., current feedback data, such as phase current values Ia and Id), raw position signals, among other possible feedback data or signals, for example. While only two current transducers 180a and 180c are shown, it should be understood that the driver system 100 may implement three current transducers.

The data processing system 101 includes a speed regulator 105, a base torque lookup table (LUT) 110, a torque processor 115, a ratio calculator 120, a q-axis current (Iq) command LUT 125, a d-axis current (Id) command LUT 130, a current regulator 135, a voltage compensator 137, converters 140, 160, a pulse width generation module 145 and a position and speed estimator 170.

The data processing system 101, including the speed regulator 105, the base torque lookup table (LUT) 110, the torque processor 115, the ratio calculator 120, the q-axis current (Iq) command LUT 125, the d-axis current (Id) command LUT 130, the current regulator 135, the voltage compensator 137, the converters 140, 160, the pulse width generation module 145 and the position and speed estimator 170 may be implemented as hardware, such as a processor, firmware or hardware executing software as a special purpose machine. When the device controller 101 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the data processing system 101. CPUs, DSPs, ASICs and FPGAs may generally be referred to as processors and/or microprocessors.

In the event that the data processing system 101 is a processor executing software, the processor is configured as a special purpose machine to execute the software to perform the functions of the speed regulator 105, the base torque lookup table (LUT) 110, the torque processor 115, the ratio calculator 120, the q-axis current (Iq) command LUT 125, the d-axis current (Id) command LUT 130, the current regulator 135, the voltage compensator 137, the converters 140, 160, the pulse width generation module 145 and the position and speed estimator 170. For example, a data processor 264 is specifically programmed to execute the speed regulator 105, the base torque lookup table (LUT) 110, the torque processor 115, the ratio calculator 120, the q-axis current (Iq) command LUT 125, the d-axis current (Id) command LUT 130, the current regulator 135, the voltage compensator 137, the converters 140, 160, the pulse width generation module 145 and the position and speed estimator 170, as will be described in FIG. 1B.

In an example embodiment, a speed regulator 105 receives input data representing a difference between an estimated rotor speed $\hat{\omega}_r$ and a command rotor speed $\omega^*_r$ as input.

The command rotor speed $\omega^*_r$ may be input by a controller (shown as 266 in FIG. 1B) via a vehicle data bus 118. For example, if an operator wants the motor 155 to run at 5,000 RPM, the operator inputs 5,000 RPM into the controller and the vehicle data bus 118 inputs the command rotor speed $\omega^*_r$ to the data processing system 101. The speed regulator 105 converts the received input data into a torque command $T_{cmd}$.

While the term command is used throughout the specification, it should be understood that command refers to a target value.

The base torque LUT 110 determines a base torque value $T_{base}$ based on the estimated rotor speed $\hat{\omega}_r$.

From the estimated rotor speed $\hat{\omega}_r$, base torque values are respectively associated with discrete speed points with a nominal dc bus voltage level. In other words, the two-dimensional base torque LUT 110 is established from a motor characterization procedure. During the IPM motor characterization procedure, each rotor shaft speed has a maximum output torque, which is defined as the base torque at that speed. Thus, the base torque may also be referred to as peak torque.

The base torque LUT 110 outputs the associated base torque value as the base torque value $T_{base}$ to the torque processor 115.

The torque processor 115 receives the base torque value $T_{base}$ and the torque command $T_{cmd}$. The torque command $T_{cmd}$ may be in Nm.

The torque processor 115 is configured to determine an absolute value of the torque command $T_{cmd}$. The torque processor 115 is configured to convert the absolute value of the torque command $T_{cmd}$ into a percentage Torq_Perc of the base torque value $T_{base}$. The torque processor 115 outputs the percentage Torq_Perc to the q-axis current (Iq) command LUT 125 and the d-axis current (Id) command LUT 130.

In addition to sending the estimated rotor speed $\hat{\omega}_r$ to the base torque LUT 110, the position and speed estimator 170 sends the estimated rotor speed $\hat{\omega}_r$ to the ratio calculator 120.

In addition to receiving the estimated rotor speed $\hat{\omega}_r$, the ratio calculator 120 is configured to receive the measured operating dc bus voltage value. The measured operating dc bus voltage value is provided by a voltage sensor 185 which measures the DC bus in the inverter circuit 150. The inverter circuit 150 is powered by a direct current (dc) voltage bus. The ratio calculator 120 adjusts the operating DC bus voltage $V_{DC}$ by the voltage sensor 185 to the detected operating rotor shaft speed ratio as follows:

$$T_{ratio} = \frac{V_{DC} \times Y}{\sqrt{3}\,\hat{\omega}_r} \quad (1)$$

where $T_{ratio}$ is the adjusted detected operating DC bus voltage to the detected operating rotor shaft speed ratio and Y is a coefficient. For example, the coefficient Y may be 0.9. The ratio $T_{ratio}$ is output by the ratio calculator 120 to the d-q axis current command LUTs 125 and 130.

The q-axis current command (Iq) LUT 125 and the d-axis current command (Id) LUT 130 are configured to receive the ratio $T_{ratio}$. The q-axis current command LUT 125 and the d-axis current command LUT 130 store q-axis and d-axis current commands, respectively, each of which is associated with a pair of ratio and torque percentage values. The development of the q-axis current command LUT 125 and the d-axis current command LUT 130 may be done using any known method.

The d-q axis current refers to the direct axis current and the quadrature axis current as applicable in the context of vector-controlled alternating current machines, such as the motor 155.

The d-axis current command LUT 130 is configured to output a d-axis current command $I^*_d$ that is associated with the received torque percentage Torq_Perc and the ratio $T_{ratio}$. As shown in FIG. 1A, the d-axis current command $I^*_d$ is output to the current regulator 135.

The q-axis current command LUT 125 is configured to output a q-axis current command $I^*_q$ that is associated with the received torque percentage Torq_Perc and ratio $T_{ratio}$.

It should be understood that $I^*_d$ and $I^*_q$ are current commands for a stator of the motor 155.

While the q-axis current command LUT 125 and d-axis current command LUT 130 are illustrated and described as LUTs, it should be understood that the q-axis current command LUT 125 and d-axis current command LUT 130 may be implemented as a set of equations that relate respective torque commands to corresponding direct and quadrature axes currents, or a set of rules (e.g., if-then rules) that relates respective torque commands to corresponding direct and quadrature axes currents.

As shown in FIG. 1A, the q-axis current command $I^*_q$ is output to the current regulator 135.

The current regulator 135 is capable of communicating with the pulse-width modulation (PWM) generation module 145 (e.g., space vector PWM generation module). The current regulator 135 receives respective d-q axis current commands (e.g., $I^*_d$ and $I^*_q$) and measured d-q axis currents (e.g., Id and Iq) for the stator and outputs corresponding pre-compensated d-q axis voltage commands $v'_d$ and $v'_q$ to a voltage compensator 137.

The voltage compensator 137 provides voltage adjustment data to adjust the pre-compensated d-q axis voltage commands $v'_d$ and $v'_q$ and outputs d-q axis voltage commands $v^*_d$ and $v^*_q$. It should be understood that the voltage compensator 137 may generate the d-q axis voltage commands (e.g., $v^*_d$ and $v^*_q$ commands) using any known method such as current feed forward compensation.

The converter 140 receives the d-q axis voltage commands $v^*_d$ and $v^*_q$ and performs an inverse Park transformation to generate α-β axis voltage commands $v^*_\alpha$ and $v^*_\beta$. While at least one example embodiment is described using the α-β axis, it should be understood that example embodiments may be implemented using the d-q axis or three phase representation of a control vector.

In an example embodiment, the PWM generation module 145 converts the α axis voltage and β axis voltage data (voltage commands $v^*_\alpha$ and $v^*_\beta$) from two phase data representations into three phase representations (e.g., three phase voltage representations, such as va*, vb* and vc*) for control of the motor 155, for example. Outputs of the PWM generation module 145 are coupled to the inverter circuit 150.

The inverter circuit 150 includes power electronics, such as switching semiconductors to generate, modify and control pulse-width modulated signals or other alternating current signals (e.g., pulse, square wave, sinusoidal, or other waveforms) applied to the motor 155. The PWM generation module 145 provides inputs to a driver stage within the inverter circuit 150. An output stage of the inverter circuit 150 provides a pulse-width modulated voltage waveform or other voltage signal for control of the motor 155. In an example embodiment, the inverter 150 is powered by the direct current (dc) voltage bus voltage $V_{DC}$.

The current transducers 180a, 180c measure two of three phase current data Ia and Ic, respectively, applied to the motor 155. It should be understood that an additional current transducer may also measure a third phase current data Ib.

The converter 160 may apply a Clarke transformation or other conversion equations (e.g., certain conversion equations that are suitable and are known to those of ordinary skill in the art) to convert the measured three-phase representations of current into two-phase representations of current based on the current data ia and ib from the current transducers 180a, 180c and an estimated rotor position $\hat{\theta}_{re}$ from the position and speed estimator 170. The output of the converter 160 module (Id, Iq) is coupled to the current regulator 135.

Figure 2:
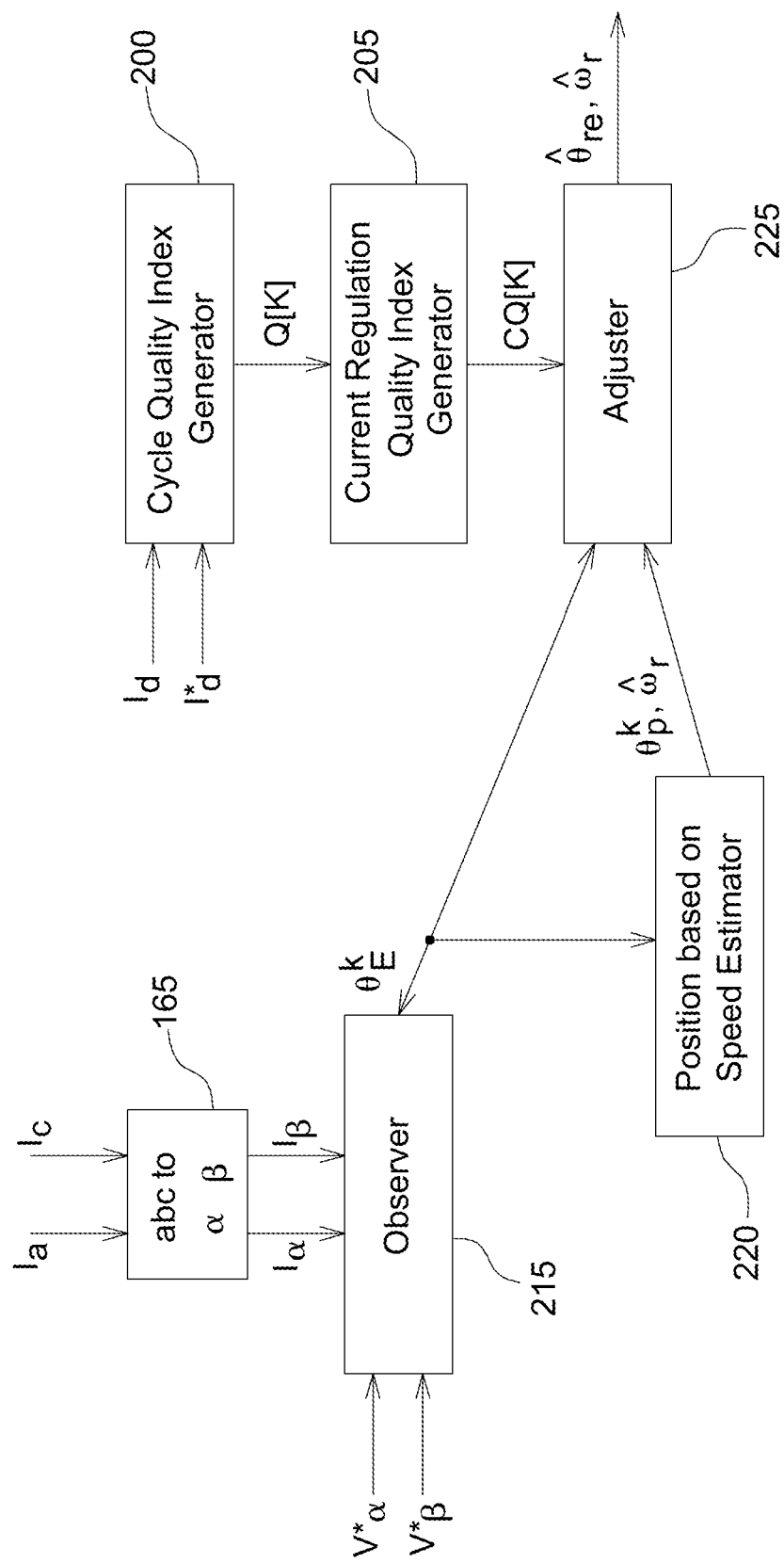

The position and speed estimator 170 may apply a Park transformation or other conversion equations (e.g., certain conversion equations that are suitable and are known to those of ordinary skill in the art) to convert the measured three-phase representations of current into two-phase representations of current (measured currents, $I_\alpha$, $I_\beta$) based on the current data Ia and Ic from the current transducers 180a, 180c, using a converter 165 (shown in FIG. 2).

The position and speed estimator 170 receives the measured currents Ia, Ic and the voltage commands $v^*_q$ and $v^*_d$. Based on the measured currents Ia, Ic and the voltage commands $v^*_q$ and $v^*_d$, the position and speed estimator 170 is configured to output the estimated rotor position $\hat{\theta}_{re}$ to the converter 160, as will be described in greater detail in FIG. 2.

The position and speed estimator 170 may also convert the estimated rotor position $\hat{\theta}_{re}$ into the estimated rotor speed $\hat{\omega}_r$.

Figure 1B:
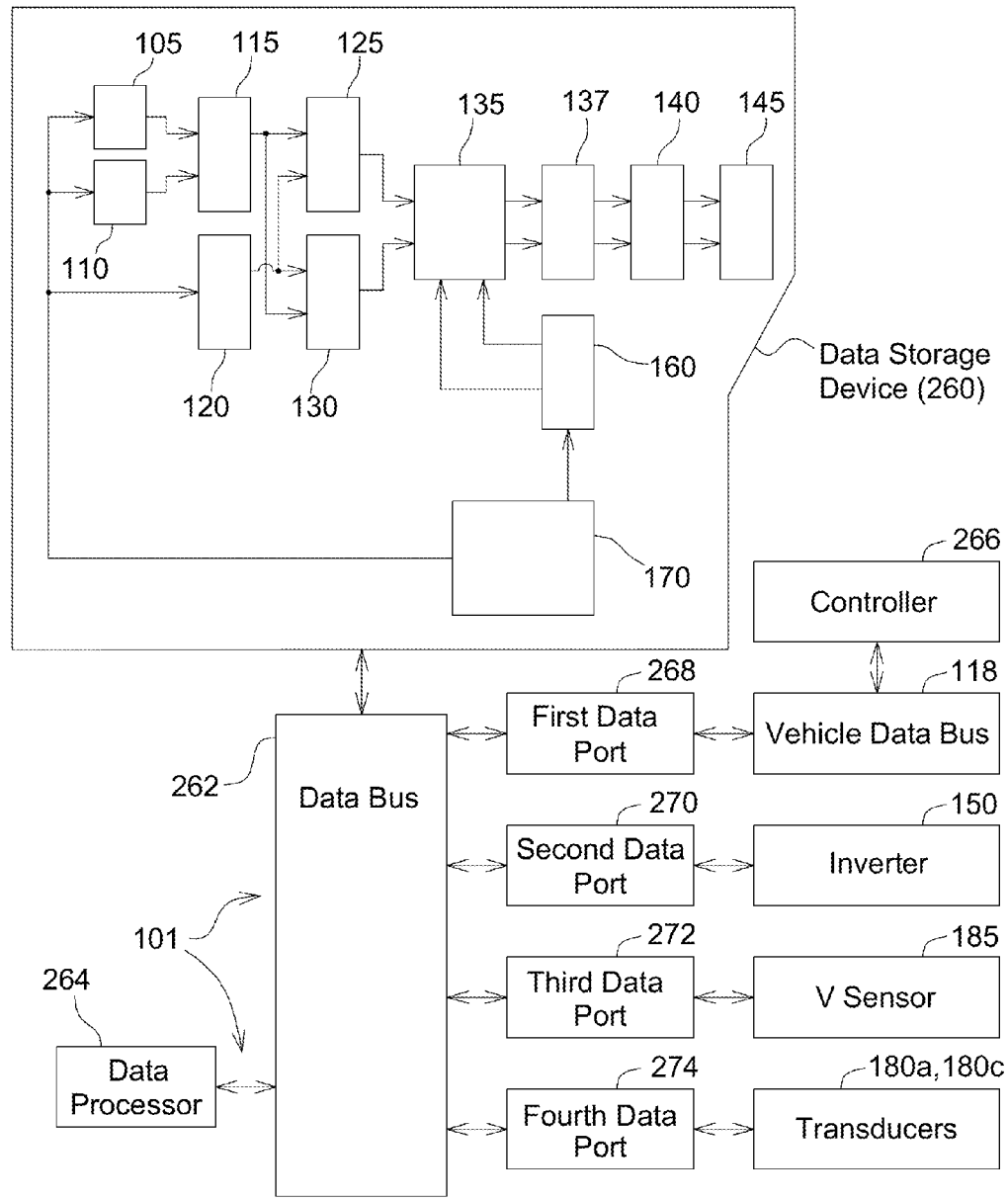
FIG. 1B illustrates a data processing system of the drive system of FIG. 1A according to an example embodiment.

In FIG. 1B, the electronic data processing system 101 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like. The storage device 260 may be a read only memory (ROM), random access memory (RAM), magnetic RAM, core memory, magnetic disk storage medium, optical storage medium, flash memory device and/or other tangible machine readable medium for storing information.

Moreover, in one example embodiment the data storage device 260 may store the algorithms implemented in the speed regulator 105, the base torque lookup table (LUT) 110, the torque processor 115, the ratio calculator 120, the q-axis current (Iq) command LUT 125, the d-axis current (Id) command LUT 130, the current regulator 135, the voltage compensator 137, the converter 140, pulse width generation module 145, the converter 160 and the position and speed estimator 170 to be executed by the data processor 264. The data processor 264 may access the data storage device 260 and execute in the speed regulator 105, the base torque lookup table (LUT) 110, the torque processor 115, the ratio calculator 120, the q-axis current (Iq) command LUT 125, the d-axis current (Id) command LUT 130, the current regulator 135, the voltage compensator 137, the converter 140, pulse width generation module 145, the converter 160 and the position and speed estimator 170 via the data bus 262.

As shown in FIG. 1B, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 1B, the first data port 268 is coupled to the vehicle data bus 118. In turn, the vehicle data bus 118 is coupled to a controller 266. In one configuration, the second data port 270 may be coupled to the inverter circuit 150; the third data port 272 may be coupled to the voltage sensor 185; and the fourth data port 274 may be coupled to the transducers 180a and 180c.

In an example embodiment of the data processing system 101, the speed regulator 105 is associated with or supported by the first data port 268 of the electronic data processing system 101. The first data port 268 may be coupled to a vehicle data bus 118, such as a controller area network (CAN) data bus. The vehicle data bus 118 may provide data bus messages with torque commands to the speed regulator 105 via the first data port 268. The operator of a vehicle may generate the torque commands via a user interface, such as a throttle, a pedal, the controller 266, or other control device.

FIG. 2 illustrates an example embodiment of the position and speed estimator 170 shown in FIG. 1A. The position and speed estimator 170 improves the stability of the sensorless drive system by implementing an adaptive speed assisted position prediction scheme.

The position and speed estimator 170 evaluates current regulation quality, which is used to evaluate the performance of position estimation. Since the change in rotor speed is much slower than the change in rotor position, the rotor speed can be viewed as a constant value in one or several switching cycles and can be used to predict rotor position. When the motor 155 has a large transition, the current regulation quality will not be good enough compared to a steady state. During a transient stage, the estimated speed may be used to temporarily predict a rotor position for controller, until the transition settles down.

As shown in FIG. 2, the position and speed estimator 170 includes the converter 165, a cycle quality index generator 200, a current regulation quality index generator 205, an observer 215, a position based on speed estimator 220 and an adjuster 225.

The cycle quality index generator 200 is configured to receive the current command $I^*_d$ and the measured current $I_d$ and generate a cycle quality index Q based on the received the current command $I^*_d$ and the measured current $I_d$ for every k cycle. The position and speed estimator 170 implements a closed-loop system. The rotor position information is estimated based on measured currents in a previous cycle. Then, the estimated position $\hat{\theta}_{re}$ is used for current control in the current cycle.

A cycle may be a pulse-width modulation (PWM) cycle or a half of a pulse-width modulation (PWM) cycle (double control mode of the pulse width modulation).

In a sensorless drive system, there is no rotor position reference, therefore, the cycle quality index generator evaluates the quality of position estimation. In an example embodiment, current regulation quality is utilized to evaluate the position regulation quality. An intuitive explanation for the relationship between quality of current regulation and position estimation is that rotor position is estimated based on measured current and a variation of position estimation should be delayed a short period of time after the currents variation.

In an example embodiment, the quality of current $i_d$ regulation is used to evaluate the quality of position estimation.

If the current command $I^*_d$ is equal to or smaller than a threshold value (e.g., 75 A), the cycle quality index generator 200 determines whether a difference between the current command $I^*_d$ and the measured current $I_d$ ($\Delta I_d$) is within an error margin that is a constant value (e.g., 15 A). If the current command $I^*_d$ is greater than the threshold value, the cycle quality index generator 200 determines whether a difference between the current command $I^*_d$ and the measured current $I_d$ is within an error margin that is a constant percentage of the current command $I^*_d$ (e.g., 20%).

If the difference between the current command $I^*_d$ and the measured current $I_d$ is within the error margin, the cycle quality index generator 200 outputs a cycle quality index Q[k] indicating that the current regulation is acceptable. For example, the cycle quality index Q[i] indicating that the current regulation is acceptable may be a "1". If the difference between the current command $I^*_d$ and the measured current $I_d$ is not within the error margin, the cycle quality index generator 200 outputs a cycle quality index Q[k] indicating that the current regulation is not acceptable. For example, the cycle quality index Q[k] indicating that the current regulation is not acceptable may be a "0".

Because the difference $\Delta I_d$ oscillates between cycles, there are several cross zero points even when the difference $\Delta I_d$ has a large oscillation. Accordingly, the current regulation quality index generator 205 monitors the cycle quality index Q[k] for a number of cycles. For a machine speed of $\omega$ rad/s with a $f_s$ Hz switching frequency, there are $2\pi f_s/p\omega$ sampling points in one electric revolution, where p is the pole-pairs number of the machine. Consequently, the current regulation quality index generator 205 may evaluate the cycle quality index Q[k] for $\pi f_s/p\omega$ consecutive sampling.

If the cycle quality index Q[k] indicates an acceptable current regulation for the consecutive number of sampling points (e.g., 20), the current regulation quality index generator 205 generates a current regulation quality index value CQ[k] indicating that the current regulation is acceptable. For example, the current regulation quality index CQ[k] indicating that the current regulation is acceptable may be a "1". If the cycle quality index Q[k] does not indicate an acceptable current regulation, the current regulation quality index generator 205 generates the current regulation quality index CQ[k] indicating that the current regulation is not acceptable. For example, the current regulation quality index CQ[k] indicating that the current regulation is not acceptable may be a "0".

The adjuster 225 selects one of the observer 215 and the position based on speed estimator 220 to determine the estimated position of the rotor based on the current regulation quality and a number of subsequent cycles. The observer 215 may implement a first algorithm for determining the estimated position of the rotor $\hat{\theta}_{re}$ and the position based on speed estimator 220 may implement a second algorithm for determining the estimated position of the rotor $\hat{\theta}_{re}$. The observer 215 may use α-β axis voltage commands $v^*_\alpha$ and $v^*_\beta$ and α-β axis measured currents Iα, Iβ as position estimation data to use to determine the estimated position of the rotor. The position based on speed estimator 220 may use an estimated speed of the rotor and previous estimated positions as position estimation data to use to determine the estimated position of the rotor.

Figure 3:
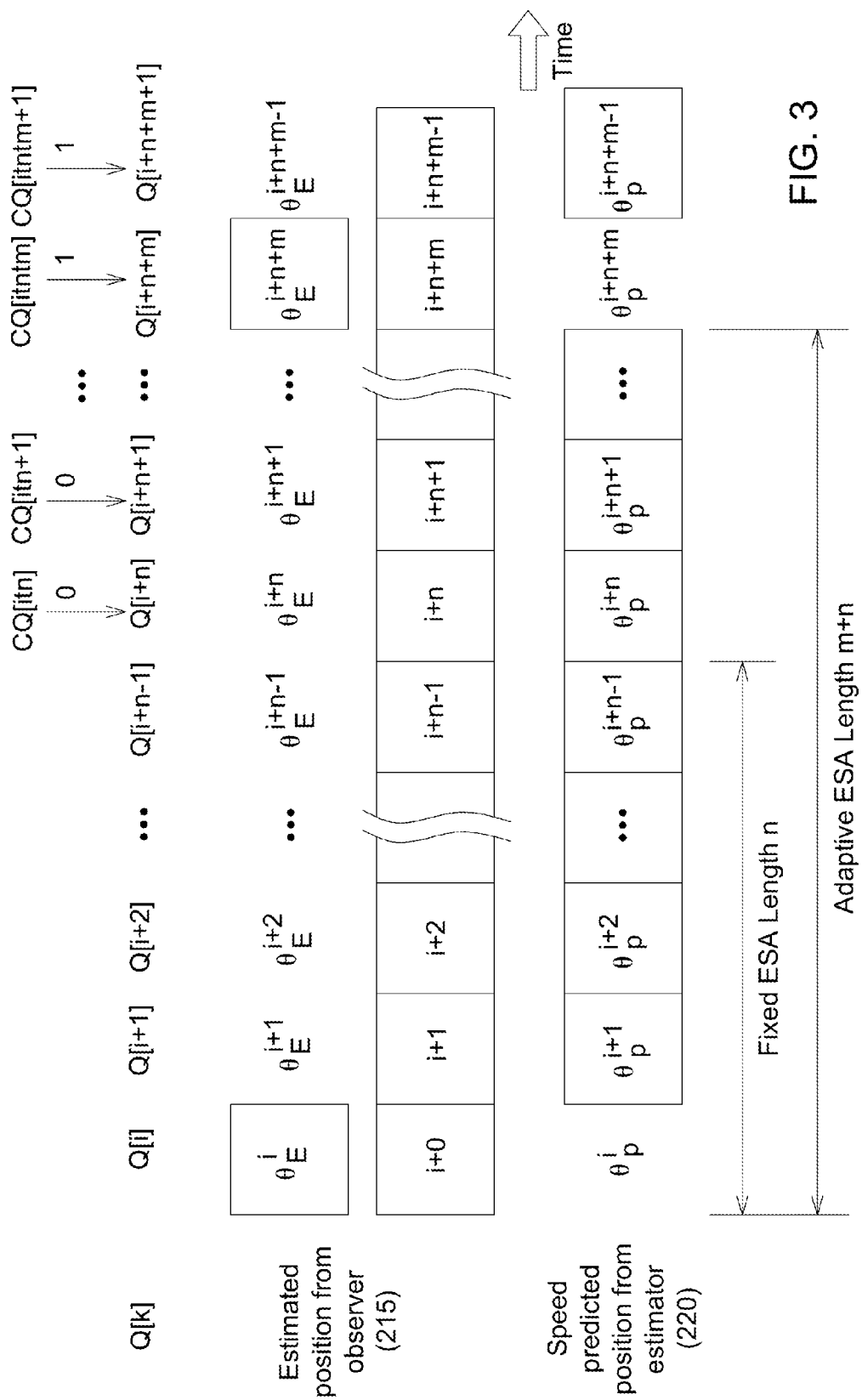

FIG. 3 illustrates an example embodiment of how the adjuster 225 selects at least one of an output from the observer 215 and the position based on speed estimator 220 to generate the estimated position of the rotor $\hat{\theta}_{re}$.

As shown in FIG. 3, the adjuster 225 initially selects the observer 215 to determine the estimated position of the rotor $\hat{\theta}_{re}$ at cycle i. The observer 215 outputs an estimated position $\theta_E^k$ as the estimated position of the rotor $\hat{\theta}_{re}$, where E indicates the estimation is from the observer 215. The observer 215 may determine the estimated position $\hat{\theta}_E^k$ based on currents $I_{\alpha,\beta}$ and voltage commands $v^*_\alpha$ and $v^*_\beta$ as described in U.S. application Ser. Nos. 13/410,792 and 13/410,623, both entitled "DRIVE SYSTEMS INCLUDING SLIDING MODE OBSERVERS AND METHODS OF CONTROLLING THE SAME," the entire contents of each of which are incorporated herein by reference. Therefore, the observer 215 will not be described in greater detail.

The adjuster 225 then selects the position based on speed estimator 220 to determine the estimated position of the rotor for at least n−1 cycles. The position based on speed estimator 220 outputs an estimated position $\theta_P^k$ as the estimated position of the rotor $\hat{\theta}_{re}$, for the values of k between i+1 and i+n−1, where P indicates the estimation is from the position based on speed estimator 220. The estimated position $\theta_P^k$ may also be referred to as a predicted position. The position based on speed estimator 220 is described in greater detail below.

After n cycles, the adjuster 225 beings to monitor the current regulation quality index CQ[k]. If the current regulation quality index CQ[k] is zero (i.e., unacceptable current regulation) after n cycles, the adjuster 225 continues to select the position based on speed estimator 220 until the current regulation quality index CQ[k] is one (i.e., acceptable current regulation). In the example shown in FIG. 3, the current regulation quality index CQ[k] becomes acceptable at m cycles from i+n.

By monitoring the cycle quality index over a consecutive number of cycles, e.g., 20 PWM cycles, the current regulation quality index generator will determine the current regulation quality evaluation and avoid error evaluation for cases like cross zero points when the measured current still has a large oscillation.

The fixed length n of an estimated speed assisted position prediction (ESAPP) means at the beginning of each ESAPP routine, the estimated position from the observer 215 is used as a starting point, and then for the next consecutive n−1 cycles, the position based on speed estimator 220 is used. The fixed length n may be based on a dynamic response.

At the $n^{th}$ step, the current regulation quality index CQ[k] is examined by the adjuster 225. If the cycle quality index Q[k] is not one or has not been one for a threshold consecutive number of times, the current is still in transient. Then, the position based on speed estimator 220 will continue to be used, until the current regulation quality index reaches the threshold consecutive number of times of being one. By adding this feature, the length of the routine is a variable larger than n, and determined by the current regulation quality. In this adaptive ESAPP scheme, both estimated position from the observer 215 and the position based on speed estimator 220 are obtained in each cycle, and one of them is selected as the control angle, such that the position output of the ESAPP scheme is the estimated position $\hat{\theta}_{re}$.

Figure 4:
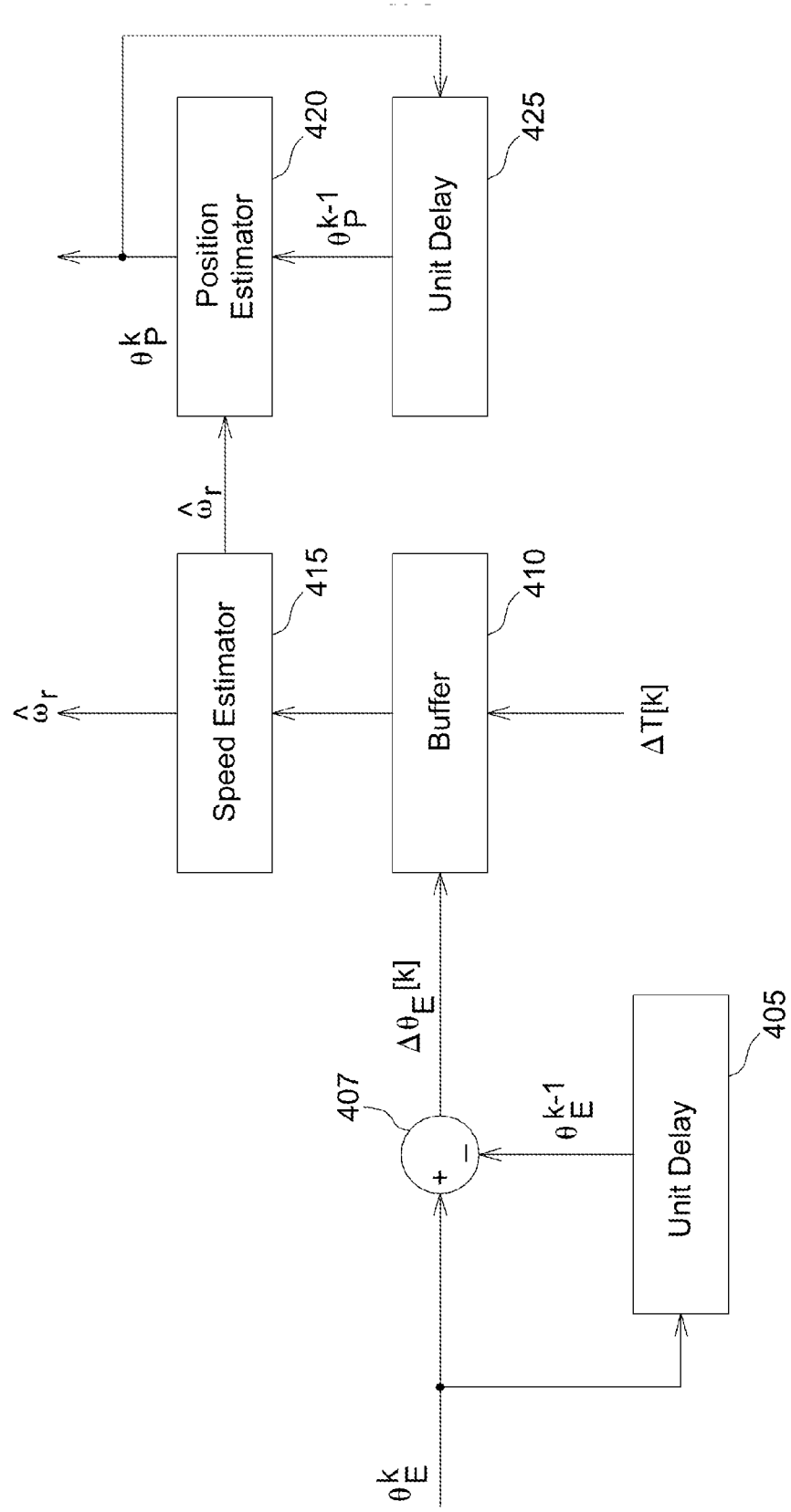

FIG. 4 illustrates an example embodiment of the position based on speed estimator 220.

As shown in FIG. 4, the position based on speed estimator 220 includes a unit delay 405, a subtractor 407, a buffer 410, a speed estimator 415, a position estimator 420 and a unit delay 425.

For the cycle i, the position based on speed estimator 220 receives the estimated position of the rotor from the observer 215 $\theta_E^i$ [i].

The position based on speed estimator 220 provides the estimated position of the rotor $\theta_E^i$ to the delay 405 and the subtractor 407. The subtractor 407 determines a difference $\Delta\theta_E$[i] in position between the estimated position of the rotor $\theta_E^i$ and the delayed estimated position of the rotor $\theta_E^{i-1}$. The buffer 410 stores the difference $\Delta\theta_E$[i] along with other previous differences and change of times associated with the differences $\Delta T$[i] to $\Delta T$[i−N+1].

For example, the buffer may store $\Delta\theta_E$[i] to $\Delta\theta_E$[i−N+1] and change of times associated with the differences $\Delta T$[i] to $\Delta T$[i−N+1], where N is the buffer size. As a result, the position change and time duration between two consecutive cycles are stored in the buffer 410. The buffer 410 may be a rolling buffer and updated in every PWM cycle or half of a PWM cycle.

The buffer size N is a variable, which can be adjusted to a dynamic response of speed. If the size of the buffer 410 is small, the speed response will be fast, however, the estimated speed normally has a larger oscillation. If the buffer size is large, the speed will be filtered smoothly, however, the speed response will be slower. As an example, the buffer size can be selected as 50 cycles.

The speed estimator 415 determines an estimated speed $\hat{\omega}_r$ using a moving average of the differences $\Delta\theta_E$[i] to $\Delta\theta_E$[i−N+1] and change of times associated with the differences $\Delta T$[i] to $\Delta T$[i−N+1] stored in the buffer 410. More specifically, the speed estimator 415 may determine the estimated speed as follows:

$$\hat{\omega}_r = \sum_{k=i}^{i-N+1} \Delta\theta_E[k] \Big/ \sum_{k=i}^{i-N+1} \Delta T[k] \qquad (2)$$

Once the speed estimator 415 determines the estimated speed $\hat{\omega}_r$, the position estimator 420 uses the estimated speed $\hat{\omega}_r$, to determine the estimated rotor position $\theta_P^i$.

Based on the estimated speed $\hat{\omega}_r$ and time duration $\Delta T$ between two consecutive PWM cycles, the rotor position can be predicted as:

$$\theta_P^i = \theta_P^{i-1} + \hat{\omega}_r * \Delta T \qquad (3)$$

where $\theta_P^{i-1}$ is generated by the unit delay 425 and input to the position estimator 420.

The variation of rotor speed $\omega_r$ changes much slower than the rotor position $\hat{\theta}_{re}$, especially in medium to high speed range. Because of this, when electric states, e.g., currents and voltages, start to have a large transition, the speed still has a relatively short stable period, which can be used to predict the rotor position $\hat{\theta}_{re}$ and be used to assist the system ride through the large transition.

Referring back to FIG. 2, the adjuster 225 may determine which estimated position $\theta_P^k$ or $\theta_E^k$ to use as the estimated position $\hat{\theta}_{re}$ based on the current regulation quality index CQ[k].

Moreover, the adjuster 225 may further implement position weighting and slewing to the selected estimated position $\theta_P^k$ or $\theta_E^k$ to generate the estimated position $\hat{\theta}_{re}$. For example, the adjuster 225 may implement a weighting factor $\lambda$ to adjust the starting point of each ESAPP iteration (e.g., at cycle i in FIG. 3), which may be between 0 and 1. The adjuster 225 may apply the weighting factor as follows:

$$\hat{\theta}_{re}[i] = \theta_P^{i-1} + \lambda(\hat{\omega}_r * \Delta T) + (1-\lambda)*(\theta_E^i - \theta_P^{i-1}) \qquad (4)$$

The adjuster 225 may adjust the weighting factor $\lambda$ to favor the speed predicted position $\theta_P^{i-1}$ or the estimated position from the observer 215 $\theta_E^i$.

Furthermore, the adjuster 225 may implement a slewing scheme if there is a difference between the estimated positions $\theta_P^k$ and $\theta_E^k$ that is greater than a threshold margin for slewing. The slewing makes a rotor position adjustment smoothly. If the difference between the estimated positions $\theta_P^k$ and $\theta_E^k$, is larger than the threshold margin for slewing, e.g., 0.5°, the position adjustment and slewing are triggered simultaneously. At first the sign of the difference between the estimated positions $\theta_P^k$ and $\theta_E^k$ is stored, and then a unit position step, e.g., 0.1 electric degrees, with an opposite sign of the difference between the estimated positions $\theta_P^k$ and $\theta_E^k$ will be added to the selected $\theta_P^k$ or $\theta_E^k$. During this procedure, 0.1 electric degrees will also be subtracted from absolute value of the difference between the estimated positions $\theta_P^k$ and $\theta_E^k$ in each PWM cycle. The adjuster 225 stops slewing when the sign of the difference between the estimated positions $\theta_P^k$ and $\theta_E^k$ turns over.

Figure 5:
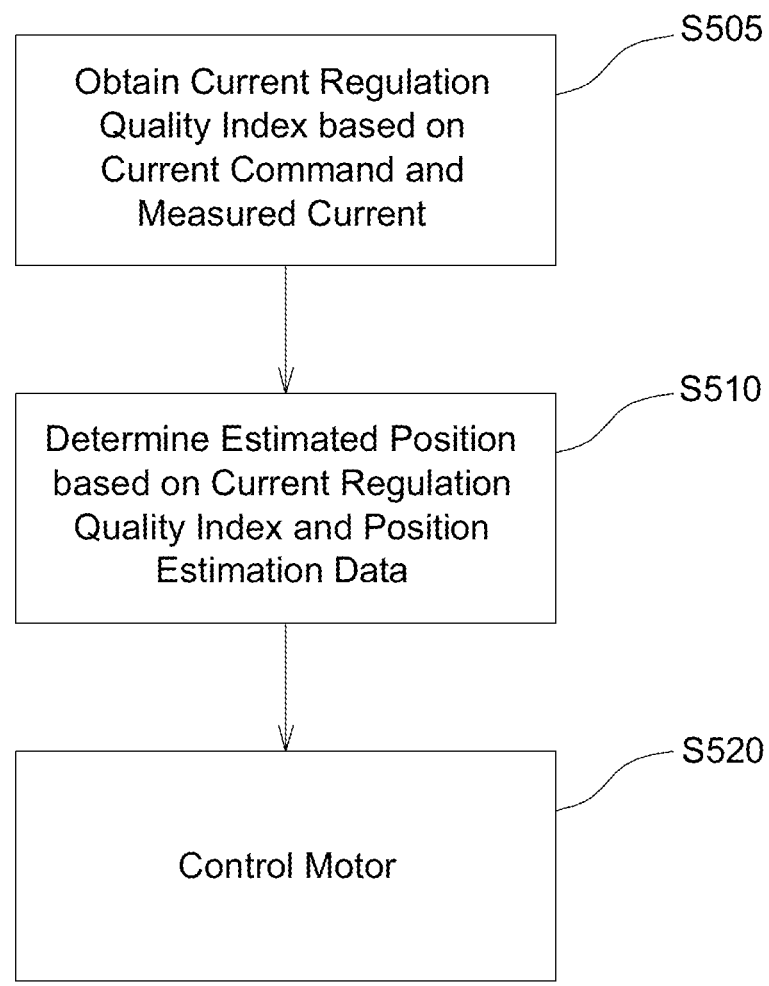

FIG. 5 illustrates a method of estimating a position of a rotor in a motor. The method may be performed by the system 100, as described above in FIGS. 1A-4 and more specifically, the data processing system 101. The method of FIG. 5 reflects the description provided above with regards to FIGS. 1A-4. At S505, the processor obtains a current regulation quality index based on a current command and a measured current. At S510, the processor determines an estimated position of the rotor based on the current regulation quality index and position estimation data. At S520, the processor controls the motor based on the estimated position of the rotor.

In an example embodiment, the obtaining a current regulation quality index comprises obtaining a current margin based on the current command, determining a first difference between the current command and the measured current and obtaining the current regulation quality index based on the current margin and the first difference.

In an example embodiment, the obtaining a current margin comprises determining if the current command exceeds a threshold value and obtaining the current margin, the current margin having a numerical value if the current command is below the threshold value and the current margin being a percentage of the current command if the current command is greater than or equal to the threshold value.

In an example embodiment, the obtaining the current regulation quality index comprises determining the first difference and additional differences between the current command and the measured current over an interval of time, the first difference and additional differences being a plurality of differences, determining, for each of the plurality of differences, if the difference is within the current margin, generating a cycle quality index value for each of the plurality of differences based on whether the difference is within the current margin, the cycle quality index value being one of a first value and a second value and obtaining the current regulation quality index based on whether a consecutive number of the cycle quality index values are the second value.

In an example embodiment, the obtaining a current regulation quality index comprises determining a plurality of cycle quality index values for a plurality of cycles, respectively, each cycle quality index value representing a current regulation quality for the corresponding cycle and obtaining the current regulation quality index based on the plurality of cycle quality index values, the current regulation quality index being one of a first value and a second value, the current regulation quality index having the second value when a consecutive number of the plurality of cycle quality index values are the second value for a first number of cycles.

In an example embodiment, the determining an estimated position of the rotor comprises initially selecting a first algorithm when the current regulation quality index is the second value and determining a first estimated position of the rotor using the first algorithm, the first estimated position of the rotor associated with a first cycle.

In an example embodiment, the determining a first position of the rotor using the first algorithm comprises determining the first estimated position using a sliding mode observer.

In an example embodiment, the determining the first estimated position of the rotor using the first algorithm is performed for a single cycle.

In an example embodiment, the method further includes selecting a second algorithm after determining the first estimated position of the rotor and determining subsequent estimated positions of the rotor using the second algorithm, the subsequent estimated positions of the rotor being associated with a number of cycles subsequent to the first cycle.

In an example embodiment, for each subsequent estimated position of the rotor, the determining subsequent estimated positions of the rotor using the second algorithm comprises obtaining a plurality of position changes of the rotor between consecutive cycles and a plurality of time durations between the consecutive cycles, obtaining an estimated speed of the rotor based on the plurality of position changes and the plurality of time durations and determining the subsequent estimated position of the rotor based on the estimated speed.

In an example embodiment, the determining subsequent estimated positions of the rotor using the second algorithm is performed for at least a second number of cycles.

In an example embodiment, the determining subsequent estimated positions of the rotor using the second algorithm is performed until the current regulation quality index channel is the second value after the second number of cycles.

In an example embodiment, the method further includes determining a difference between the first estimated position and a previous subsequent estimated position, weighting the previous subsequent estimated position based on the difference between the first estimated position and the previous subsequent estimated position and selecting the weighted previous subsequent estimated position to use in the second algorithm.

In an example embodiment, the method further includes determining a difference between the first estimated position and a previous subsequent estimated position, determining if the difference between the first estimated position and the previous subsequent estimated position exceeds an adjustment threshold, applying a slew rate to the first estimated position if the difference between the first estimated position and the previous subsequent estimated position exceeds the adjustment threshold and selecting the slewed first estimated position to use in the second algorithm.

In an example embodiment, the cycles are pulse-width modulation (PWM) cycles.

In an example embodiment, the cycles are halves of pulse-width modulation (PWM) cycles.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of estimating a position of a rotor in a motor, the method comprising:
   obtaining a current regulation quality index based on a current command and a measured current, the current regulation quality index indicating a quality of current regulation, the obtaining the current regulation quality index comprises,
      obtaining a current margin based on the current command,
      determining a first difference between the current command and the measured current, and
      obtaining the current regulation quality index based on a current margin and the first difference;
   determining an estimated position of the rotor based on the current regulation quality index and position estimation data; and
   controlling the motor based on the estimated position of the rotor.

2. The method of claim 1, wherein the obtaining the current margin comprises, determining if the current command exceeds a threshold value; and the current margin having a numerical value if the current command is below the threshold value and the current margin being a percentage of the current command if the current command is greater than or equal to the threshold value.

3. The method of claim 1, wherein the obtaining the current regulation quality index comprises,
determining the first difference and additional differences between the current command and the measured current over an interval of time, the first difference and additional differences being a plurality of differences;
determining, for each of the plurality of differences, if the difference is within the current margin;
generating a cycle quality index value for each of the plurality of differences based on whether the difference is within the current margin, the cycle quality index value being one of a first value and a second value; and
obtaining the current regulation quality index based on whether a consecutive number of the cycle quality index values are the second value.

4. The method of claim 1, wherein the obtaining a current regulation quality index comprises,
determining a plurality of cycle quality index values for a plurality of cycles, respectively, each cycle quality index value representing a current regulation quality for the corresponding cycle; and
obtaining the current regulation quality index based on the plurality of cycle quality index values, the current regulation quality index being one of a first value and a second value, the current regulation quality index having the second value when a consecutive number of the plurality of cycle quality index values are the second value for a first number of cycles.

5. The method of claim 4, wherein the determining an estimated position of the rotor comprises,
initially selecting a first algorithm when the current regulation quality index is the second value; and
determining a first estimated position of the rotor using the first algorithm, the first estimated position of the rotor associated with a first cycle.

6. The method of claim 4, wherein the cycles are pulse-width modulation (PWM) cycles.

7. The method of claim 4, wherein the cycles are halves of pulse-width modulation (PWM) cycles.

8. The method of claim 5, wherein the determining a first position of the rotor using the first algorithm comprises,
determining the first estimated position using a sliding mode observer.

9. The method of claim 5, wherein the determining the first estimated position of the rotor using the first algorithm is performed for a single cycle.

10. The method of claim 5, further comprising:
selecting a second algorithm after determining the first estimated position of the rotor; and
determining subsequent estimated positions of the rotor using the second algorithm, the subsequent estimated positions of the rotor being associated with a number of cycles subsequent to the first cycle.

11. The method of claim 10, wherein, for each subsequent estimated position of the rotor, the determining subsequent estimated positions of the rotor using the second algorithm comprises,
obtaining a plurality of position changes of the rotor between consecutive cycles and a plurality of time durations between the consecutive cycles;
obtaining an estimated speed of the rotor based on the plurality of position changes and the plurality of time durations; and
determining the subsequent estimated position of the rotor based on the estimated speed.

12. The method of claim 10, wherein the determining subsequent estimated positions of the rotor using the second algorithm is performed for at least a second number of cycles.

13. The method of claim 12, the determining subsequent estimated positions of the rotor using the second algorithm is performed until the current regulation quality index channel is the second value after the second number of cycles.

14. The method of claim 10, further comprising:
determining a difference between the first estimated position and a previous subsequent estimated position;
weighting the previous subsequent estimated position based on the difference between the first estimated position and the previous subsequent estimated position; and
selecting the weighted previous subsequent estimated position to use in the second algorithm.

15. The method of claim 10, further comprising:
determining a difference between the first estimated position and a previous subsequent estimated position;
determining if the difference between the first estimated position and the previous subsequent estimated position exceeds an adjustment threshold;
applying a slew rate to the first estimated position if the difference between the first estimated position and the previous subsequent estimated position exceeds the adjustment threshold; and
selecting the slewed first estimated position to use in the second algorithm.

16. A system comprising:
a processor configured to estimate a position of a rotor in a motor, the processor configured to,
obtain a current regulation quality index based on a current command and a measured current, the current regulation quality index indicating a quality of current regulation in the system;
determine an estimated position of the rotor based on the current regulation quality index and position estimation data;
obtain a current margin based on the current command;
determine a first difference between the current command and the measured current; and
obtain the current regulation quality index based on the current margin and the first difference.

17. The system of claim 16, wherein the processor is configured to,
determine if the current command exceeds a threshold value, and
obtain the current margin, the current margin having a numerical value if the current command is below the threshold value and the current margin being a percentage of the current command if the current command is greater than or equal to the threshold value.

18. The system of claim 16, wherein the processor is configured to,
determine the first difference and additional differences between the current command and the measured current over an interval of time, the first difference and additional differences being a plurality of differences,
determine, for each of the plurality of differences, if the difference is within the current margin, generate a cycle quality index value for each of the plurality of differences based on whether the difference is within the current margin, the cycle quality index value being one of a first value and a second value, and obtain the current regulation quality index based on whether a consecutive number of the cycle quality index values are the second value.

19. The system of claim 16, wherein the processor is configured to, determine a plurality of cycle quality index values for a plurality of cycles, respectively, each cycle quality index value representing a current regulation quality for the corresponding cycle, and obtain the current regulation quality index based on the plurality of cycle quality index values, the current regulation quality index being one of a first value and a second value, the current regulation quality index having the second value when a consecutive number of the plurality of cycle quality index values are the second value for a first number of cycles.

20. The system of claim 19, wherein the processor is configured to, initially select a first algorithm when the current regulation quality index is the second value, and determine a first estimated position of the rotor using the first algorithm, the first estimated position of the rotor associated with a first cycle.

21. The system of claim 19, wherein the cycles are pulse-width modulation (PWM) cycles.

22. The system of claim 19, wherein the cycles are halves of pulse-width modulation (PWM) cycles.

23. The system of claim 20, wherein the processor is configured to determine the first estimated position using a sliding mode observer.

24. The system of claim 20, wherein the processor is configured to use the first algorithm for a single cycle.

25. The system of claim 20, the processor is configured to, select a second algorithm after determining the first estimated position of the rotor, and determine subsequent estimated positions of the rotor using the second algorithm, the subsequent estimated positions of the rotor being associated with a number of cycles subsequent to the first cycle.

26. The system of claim 25, wherein, for each subsequent estimated position of the rotor, the processor is configured to, obtain a plurality of position changes of the rotor between consecutive cycles and a plurality of time durations between the consecutive cycles, obtain an estimated speed of the rotor based on the plurality of position changes and the plurality of time durations, and determine the subsequent estimated position of the rotor based on the estimated speed.

27. The system of claim 25, wherein the processor is configured to use the second algorithm for at least a second number of cycles.

28. The system of claim 27, the processor is configured to use the second algorithm until the current regulation quality index channel is the second value after the second number of cycles.

29. The system of claim 25, the processor is configured to, determine a difference between the first estimated position and a previous subsequent estimated position, weight the previous subsequent estimated position based on the difference between the first estimated position and the previous subsequent estimated position, and select the weighted previous subsequent estimated position to use in the second algorithm.

30. The system of claim 25, the processor is configured to, determine a difference between the first estimated position and a previous subsequent estimated position, determine if the difference between the first estimated position and the previous subsequent estimated position exceeds an adjustment threshold, apply a slew rate to the first estimated position if the difference between the first estimated position and the previous subsequent estimated position exceeds the adjustment threshold, and select the slewed first estimated position to use in the second algorithm.

* * * * *